United States Patent [19]

Duncan

[11] 4,165,968

[45] Aug. 28, 1979

[54] COMPOSITION FOR COATING CHARCOAL BRIQUETTES

[76] Inventor: Norman B. Duncan, 301 S. Highland, Las Vegas, Nev. 89106

[21] Appl. No.: 904,334

[22] Filed: May 9, 1978

[51] Int. Cl.² ............... C10L 9/00; C10L 10/00; C10L 7/00

[52] U.S. Cl. .................................. 44/6; 44/7 B; 44/10 R; 44/41

[58] Field of Search ............. 44/6, 41, 7 A, 7 B, 44/10 R

[56] References Cited

U.S. PATENT DOCUMENTS

| | | | |
|---|---|---|---|
| 2,613,142 | 10/1952 | Wiczer | 44/7 B |
| 3,183,068 | 5/1965 | Monick | 44/7 B |
| 3,337,312 | 8/1967 | Perlus | 44/6 |
| 3,395,002 | 7/1968 | Winnicki et al. | 44/6 |
| 3,540,865 | 11/1970 | Pape | 44/41 |
| 3,754,877 | 8/1973 | Klug | 44/7 B |
| 3,988,121 | 10/1976 | Leveskis | 44/41 |

*Primary Examiner*—Carl Dees
*Attorney, Agent, or Firm*—Clarence A. O'Brien; Harvey B. Jacobson

[57] ABSTRACT

A rapidly ignitable and even burning charcoal briquette having a coating formed thereon comprised of a flammable alcohol and a wicking material bound to the surface of the briquette by a layer of gel-like material. The invention also comprises a method for forming said ignitable coating.

13 Claims, No Drawings

COMPOSITION FOR COATING CHARCOAL BRIQUETTES

BACKGROUND OF THE INVENTION

1. Field of the Invention

The invention generally relates to solid carbonaceous fuel materials and to readily ignitable coatings therefor which on burning more rapidly ignite the fuel material. In particular, the invention relates to carbonaceous fuel materials commonly known as charcoal, which materials are formed into briquettes used for cooking foods directly thereover.

2. Description of the Prior Art

Charcoal briquettes have long been employed for cooking of foods, the foods typically being disposed directly over the briquettes with only an apertured grill disposed therebetween. Briquettes so used are usually ignited after saturation with a flammable liquid. When using such liquids, it is necessary to wait a sufficient time to assure complete burning of the liquid, a significant portion of the charcoal having to be burned to guarantee that the liquid, which liquid would degrade the food if the food were cooked over the charcoal prior to consumption of the liquid, is completely burned. A substantial amount of time is required and a certain portion of the mass of the briquettes of accordingly lost before the food to be cooked can be placed over the briquettes when this common practice is employed. Further, during ignition of briquettes so saturated, the liquid can flash or flame-up in a dangerous fashion. Ignitable coatings have also been proposed for briquettes, the coatings typically containing an ignitable material which penetrates the porous briquettes to a depth which requires that a significant portion of the body of the briquette be burned away so that the ignitable material is consumed prior to use of the briquette for cooking. Therefore, a substantial amount of time is still required before the briquettes are ready for use, a greater amount of charcoal being also required for a given cooking situation since a substantial portion of the charcoal mass must be burned away prior to use.

Reference is made to U.S. Pat. No. 3,337,312, issued to Perlus and to U.S. Pat. No. 3,431,093, issued to Kreinik wherein extensive descriptions of prior charcoal briquettes are provided, the disadvantages of the briquettes of the art prior to Perlus and Kreinik being discussed. In particular, prior briquettes have typically been either difficult to ignite or so flammable that ignition of the briquettes with a match proves to be dangerous. Further, prior attempts to provide an instant-igniting charcoal briquette often resulted in the use of ignitable materials which burned with the emission of heavy smoke, a situation understandably unpleasant to a user of the charcoal briquette. Ignitable coatings for charcoal briquettes which have been provided more recently have typically been expensive and have included flammable liquid materials which penetrate the briquette to a distance which requires the burning of a substantial portion of the mass of the briquette prior to use thereof, a bed of ignited briquettes or "coals" suitable for cooking typically requiring an extended period of time due to the necessity for awaiting the complete combustion of the coating and of the flammable liquid material which has penetrated into the body of the briquette. Accordingly, the prior art has not provided an inexpensive coating for charcoal briquettes, which coating is readily ignitable without danger to a user of the charcoal and which burns rapidly and without consumption of substantial portions of the mass of the briquette to allow rapid formation of a bed of "coals" suitable for cooking.

SUMMARY OF THE INVENTION

According to the present invention, a gel is formed of gum cellulose, such as a wheat XG-485-S-XG-499-S seldon husk manufactured by General Mills as a by-product of breakfast food manufacture, and an alcohol, such as methanol. The gel is coated onto the surfaces of charcoal briquettes, such as by submergence of the briquettes in the gel. The gel is further comprised of particles of an expanded perlite, the perlite providing wicking action to the flammable gel to render the gel and thus the briquettes more readily ignitable. The expanded perlite further reduces evaporation of the alcohol and, together with the gum cellulose, holds the alcohol in suspension, seals the briquette, and prevents the briquette from crumbling. The briquettes thus coated are cooled at a temperature preferably between 10 degrees and 32 degrees F., the gel being caused to solidify and adhere to the briquette while the alcohol is in suspension, loss by evaporation being thereby reduced. The coated briquettes are then stored in an airtight container to prevent evaporation of the alcohol from the gel coating during storage.

It is therefore an object of the present invention to provide a charcoal briquette having an ignitable coating formed thereon, the constituents of the coating remaining substantially on or near the surface of the briquette.

It is a further object of the invention to provide a rapidly ignitable charcoal briquette which can be ignited with a match or other readily available source of flame and which does not emit objectionable smoke and odor.

It is a further object of the invention to provide a rapidly ignitable charcoal briquette which does not require a substantial amount of time after ignition to burn away the coating and provide a bed of burning briquettes suitable for cooking.

It is yet another object of the invention to provide a coating for a charcoal briquette, which coating is readily ignitable and acts to ignite the briquette itself without the need for burning away substantial portions of the mass of the briquette.

These together with other objects and advantages which will become subsequently apparent reside in the details of manufacture and use of the invention as more fully hereinafter described and claimed.

BRIEF DESCRIPTION OF THE PREFERRED EMBODIMENT

According to the invention, a gelable mixture is formed by mixing a flammable alcohol with a material which can be generally described as a XG-485-S XG-499-S or Kucel HF gum cellulose, an expanded perlite material being added to the gel mixture prior to submergence or spraying of charcoal briquettes into the mixture. After coating of the briquettes with the gel mixture the briquettes are drained and subjected to a temperature preferably in the range of −10°-32° F. The subjection of the coated briquettes to the cooling temperature causes the gel coating to rapidly solidify and to adhere more readily to the briquette while the alcohol is still in suspension within the gel coating. Penetration of the alcohol into the body of the briquette is therefore minimized, it being the intention of the present invention to provide a surface coating on the briquette rather than to impregnate the briquette with a flammable material. The alcohol suspended within the gel coating acts as a fuel which enables the coating to be readily ignitable and to burn sufficiently to ignite the briquette itself. The gum cellulose material acts as a binder to maintain the alcohol in suspension with the coating. The expanded perlite also absorbs the alcohol and acts as a wicking agent to provide rapid ignition without the danger of flash or flame-up. The resulting coated charcoal briquette ignites instantly at the touch of a flame and burns without smoke or odor. When a plurality of the briquettes are used to provide a bed of coals for cooking of food, the entire bed of charcoal becomes ready for use within an unusually short time due to the fact that all of the briquettes are coated, each of the briquettes igniting at substantially the same time and burning uniformly.

The fuel component of the present coating is a flammable alcohol which is chosen in large measure for the expense thereof. For example, toxicity of a given alcohol is immaterial due to the fact that the weight percentage of the alcohol within the present coating is typically 4% or less and that the alcohol typically penetrates the body of the briquette to a depth of less than ⅛ of an inch, the present invention providing a surface coating for a charcoal briquette rather than an essentially impregnated briquette. After ignition of the present coating, the briquettes burn with a relatively low flame, the alcohol being substantially oxidized by the time that the flame has burned out to leave the briquettes in an ignited condition and burning in a self-sufficient manner. While the lower aliphatic alcohols, including methanol, ethyl alcohol the several propanols, etc., are preferred for use with the present invention due to the cost thereof, it is to be understood that any flammable alcohol can be used in the practice of the present invention. The preferred alcohol used in the practice of the present invention is methanol due to the lower expense thereof, and to its ready use in the formation of a gel coating according to the invention. Therefore, the invention will be described hereinafter as utilizing methanol as the fuel component of the gel coating.

The material used with the alcohol component of the invention to form a gel material into which the briquettes are submerged or sprayed preferably comprises a gum cellulose, such as the product known as wheat seldon husk, a General Mills product referred to by the designation XG485S, or-XG499-S the husk being ground to a fine powder of 200 to 300 Tyler screen mesh. Wheat seldon husk is a by-product of breakfast food manufacture which in powder form combines with alcohol to produce a gel mixture which will adhere to the surface of a briquette. Gum cellulose is also available from other sources, for example, the Kucel-HF cellulose product produced by the Hercules Corporation being also useful in the practice of the invention but which is substantially higher in cost.

Wicking action is provided to the present gel coating by the addition of an expanded perlite material to the gel mixture. While the expanded perlite can be present in the gel mixture in a particle size ranging from 16 to 300 Tyler screen mesh, a mesh of between 200 and 300 is preferred. In the gel coating itself, the expanded perlite provides a wicking action to enable the briquette to be instantly ignited without the danger of flash or flame-up. The expanded perlite further absorbs at least a portion of the alcohol within the coating, thereby reducing evaporation of alcohol from the coating by approximately 90% relative to a coating not containing the expanded perlite. It should be noted that the perlite component of the present gel coating can take form of any absorptive material which can be formed into particles of the desired size. For example, zonolite can be used in place of expanded perlite, the zonolite being more expensive and therefore being less preferable in actual use. Zonolite is a trademark for verxite, also known as expanded hydrobiotite.

The gel mixture from which the present gel coating is formed can also be provided with additional constituents such as sodium chloride (table salt) or any other material which acts to cause the coating to burn with a visible flame. Since briquettes coated according to the present invention burn with a substantially invisible flame, the provision of an inexpensive material such as Morton table salt can therefore be provided as a safety factor so that a user thereof can determine when the open flame with which the coating burns has been extinguished through complete oxidation of the coating.

In describing an exact process for manufacture of coated briquettes according to the invention, quantities of materials sufficient to provide a 100 gallon gel mixture will be referred to, it being understood that proportional amounts can be readily employed to form batch mixtures of lesser or greater quantity. Although 100 gallons of methanol is employed to form the gel mixture, only ½ of the methyl alcohol, that is, 50 gallons, is initially placed within a suitable mixing container, the remaining portion of the methanol being preferably added at a later time. Although the full 100 gallons could be placed within the mixing container initially, the time required for mixing of the gel mixture is longer. When methanol is used, water is added to the methyl alcohol to reduce the purity of the alcohol to approximately 90%. The addition of water acts to further reduce flashing of the alcohol within the gel coating when the briquette is ignited. Solid alcohols can be used in the practice of the invention by dissolving the alcohol in water, the volumetric measure of the alcohol then being a measure of the volume of the water and alcohol solution. Organic solvents and co-solvent mixtures can be utilized in a known fashion to bring relatively insoluble alcohols into aqueous solution for use in the present invention.

If an additive is to be employed in the gel coating to cause the coating to burn with a visible flame, this additive can now be mixed into the alcohol-water solution. The preferred additive for such a purpose comprises 5 to 10 pounds of ordinary Morton table salt.

The gum cellulose material, typically 11 pounds of whet seldon or Kucel-HF husk as described hereinabove, is added to the alcohol-water solution, the gum cellulose material combining with the alcohol to produce a gel mixture. 22 pounds of expanded perlite as described hereinabove is then added to the gel mixture, the above ingredients being blended together to produce a viscous slurry. The remaining 50 gallons of methanol is then mixed with the viscous slurry to produce approximately 100 gallons of the gel mixture.

The briquettes to be coated are then submerged immediately into the gel mixture for approximately one to five minutes, the briquettes preferably being submerged or sprayed until out-gasing of the briquettes terminates. A submergence time of one minute produces a minimum coating suitable for use in the practice of the invention. The thickness of the gel coating increases with submersion time, submersion of the briquettes in the gel mixture for more than five minutes producing a coating which by its thickness is wasteful of materials. The briquettes are removed from the gel mixture and drained. The coated briquettes are then immediately cooled at a temperature within the range of $-10°-32°$ F. The briquettes are preferably disposed on a conveyor and passed through a cooling tunnel or chamber which provides a thermal environment within the temperature range indicated. This immediate immersion of the coated briquettes into a cold atmosphere reduces evaporative loss of the alcohol and causes the gel coating to quickly solidify and adhere to the surface of the briquette while major amounts of the alcohol are still in suspension. Further, rapid and complete solidification of the gel coating causes the perlite to remain well distributed within the coating. The solidification of the gel coating immediately after removal from the gel mixture limits the penetration of the alcohol into the briquette to a maximum of approximately 1/32 to ⅛ of an inch, which limited penetration reduces the time for oxidation of the alcohol and thereby renders the briquettes usable within a shorter period of time after ignition. The coated briquettes are then stored within an air-tight container, a foil bag with relatively small pores being preferably used to prevent alcohol escape during storage. A surlyn foil bag, such as available from the Crown Zellerbach Corporation is preferably used for storage of the coated briquettes.

The coating formed on the briquettes is capable of instant ignition and burns away within two to ten minutes depending on the thickness of the coating and the depth of penetration of the alcohol within the body of the briquette. By subjecting the coated briquettes to cooling as described hereinabove immediately after the briquettes are removed from the gel mixture, penetration of the alcohol into the body of the briquette is minimized. The gum cellulose material acts as a binder to maintain the alcohol in suspension, the expanded perlite disposed throughout the coating also acting to absorb alcohol and to thereby maintain the alcohol in locations throughout the coating. The wicking action of the alcohol-containing expanded perlite particles allows instant ignition of the coated briquette, the briquettes burning uniformly to produce a bed of charcoal which is ready for use within seven to ten minutes of ignition. Since the coated briquettes formed according to the present invention are provided with a surface coating, a minimum quantity of charcoal is lost during the process of igniting the briquettes since major portions of the briquettes do not have to be burned away in the process of consuming the fuel component of the coating.

The foregoing is considered as illustrative only of the principles of the invention. Further, since numerous modifications and changes will readily occur to those skilled in the art, it is not desired to limit the invention to the exact method of manufacture and composition described. Accordingly, all suitable modifications and equivalents may be resorted to which fall within the scope of the invention claimed hereinafter.

What is claimed as new is as follows:

1. A rapidly ignitable, even burning charcoal briquette having a coating disposed thereon, the coating comprising a gelled mixture of a flammable alcohol, gum cellulose, and a wicking material comprising expanded perlite in particulate form.

2. The briquette of claim 1 wherein the alcohol comprises methyl alcohol.

3. The briquette of claim 1 wherein the wicking material comprises an expanded perlite material.

4. The briquette of claim 3 wherein the gum cellulose and perlite material are present in the coating in equal amounts based on weight.

5. The briquette of claim 1 and further comprising a material which burns with a visible flame.

6. The briquette of claim 5 wherein the last-mentioned material comprises sodium chloride.

7. The briquette of claim 1 wherein the alcohol comprises methyl alcohol and is present in the coating in a weight percent of approximately 97%, the wicking material comprises an expanded perlite and is present in the coating in a weight percent of approximately 1.5%, and the gum cellulose is present in the coating in a weight percent of approximately 1.5%.

8. The briquette of claim 1 wherein the gum cellulose comprises wheat seldon husk.

9. The briquette of claim 1 wherein the coating further comprises water.

10. The briquette of claim 1 wherein the gum cellulose is in particulate form in a size range between 200 to 300 Tyler screen mesh.

11. The briquette of claim 1 wherein the wicking material is in particulate form in a size range between 16 and 300 Tyler screen mesh.

12. The method for forming an ignitable coating on a charcoal briquette, comprising the steps of:
   mixing a flammable alcohol, gum cellulose, and a wicking material selected from the group consisting of expanded perlite and expanded hydrobiotite in particulate form to form a gel mixture;
   submerging the briquette in the gel for a period of time between one and five minutes;
   removing the briquette from the gel mixture and draining the briquette; and,
   subjecting the coated briquette to a temperature in the range between $-10°$ and $32°$ F. to solidify the coating.

13. A rapidly ignitable, even burning charcoal briquette having a coating disposed thereon, the coating comprising a gelled mixture of a flammable alcohol, gum cellulose, and a wicking material in particulate form, said wicking material being selected from the group consisting of an expanded perlite and expanded hydrobiotite.

* * * * *